Patented Sept. 23, 1947

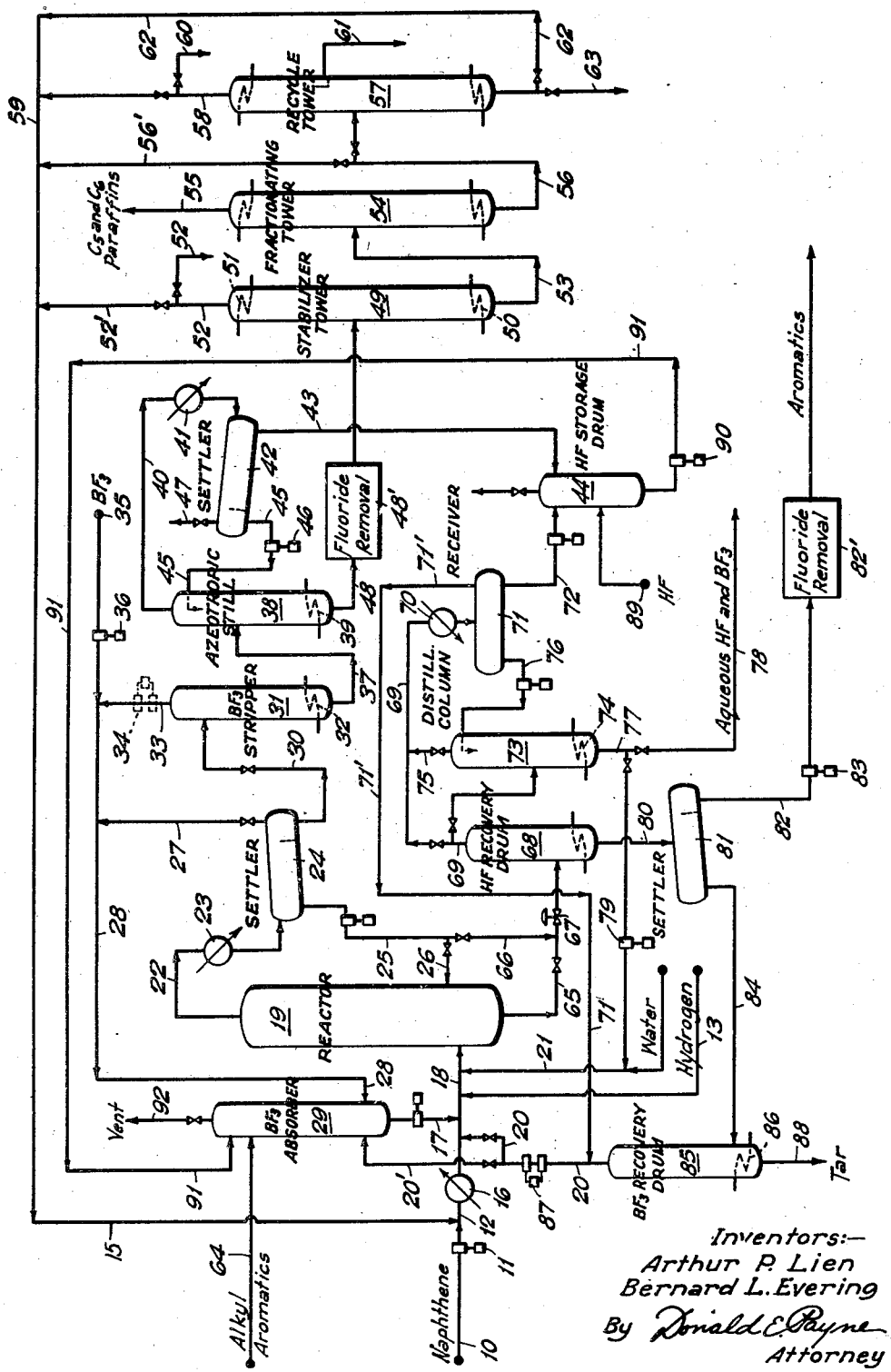

2,427,865

UNITED STATES PATENT OFFICE 2,427,865

CONVERSION OF NAPHTHENES TO PARAFFINS

Arthur P. Lien, Hammond, Ind., and Bernard L. Evering, Chicago, Ill., assignors to Standard Oil Company, Chicago, Ill., a corporation of Indiana Application August 21, 1944, Serial No. 550,336

10 Claims. (Cl. 260—676)

This invention relates to the conversion of naphthenic hydrocarbons to open-chain isoparaffinic hydrocarbons by means of a hydrogen fluoride-boron fluoride catalyst, preferably in the presence of hydrogen.

Naphthenic hydrocarbons such as cyclohexane are much less valuable than branched-chain paraffinic hydrocarbons for use in motor fuels and particularly aviation gasoline. Heretofore no commercially feasible method has been available for converting naphthenes to branched-chain paraffins. An object of our invention is to provide such a method.

Processes have been proposed for treating gasoline or gas oil fractions and paraffinic hydrocarbons of the naphtha boiling range with boron fluoride promoted by hydrogen chloride (U. S. 2,344,789). Our object is to avoid the difficulties that are inherent in the use of hydrogen chloride such as complete miscibility of liquid hydrogen chloride with the hydrocarbon, low critical temperature of hydrogen chloride, etc. A further object is to provide a process for converting naphthenes, such as cyclohexane, which are much more refractory than ordinary gasoline, gas oils or paraffinic hydrocarbons. Another object is to convert low boiling naphthenes into large yields of isobutane, branched-chain $C_5, C_6$ and $C_7$ hydrocarbons and higher boiling naphthenes, the latter being considerably more valuable than low boiling naphthenes because on dehydrogenation they can be converted into an exceptionally high quality high solvency naphtha.

A further object of our invention is to provide an improved method and means for effecting conversion of naphthenes with a hydrogen fluoride-boron fluoride catalyst in the presence of added hydrogen and for expeditiously and almost quantitatively recovering catalyst from product and by-product streams so that make-up catalyst requirements are reduced to a minimum. A further object is to provide a method and means for increasing the yields of desired products by recycling particular fractions of the resulting products. Other objects of the invention will be apparent as the detailed description thereof proceeds.

In practicing our invention we employ a catalyst which consists chiefly of hydrogen fluoride but which contains about 1 to 40 weight percent (based on hydrogen fluoride) preferably 5 to 20 weight percent of boron fluoride. Such catalyst may contain a trace of water, i. e. about .01 to 1% but preferably not more than about 3%. Our naphthene charging stock together with recycled material is preferably contacted with a large mass of liquid catalyst in the presence of added hydrogen at a temperature within the approximate range of 150 to 450° F., preferably 250 to 350° F., and under a total pressure of 600 to 3000, preferably 1200 to 2000 pounds per square inch. The catalyst phase in the reaction zone may constitute about 20 to 70% by volume of the total content thereof. The time of contact will depend of course upon temperature, catalyst composition, amount and concentration of catalyst and intimateness of contact and other factors and in a continuous process it may range from a few minutes to several hours, e. g. about .01 to 4 hours. The space velocity in a system wherein a large amount of catalyst is retained in a reaction zone may be in the approximate range of .1 to 4 usually about .5 to 1 volumes of total charging stock per hour per volume of catalyst in the reaction zone. The amount of hydrogen may be in the approximate range of 100 to 600, preferably about 200 to 400 cubic feet per barrel of stock charged. The catalyst to hydrocarbon ratio in the total charge entering the reaction zone may be within the approximate range of .05:1 to .5:1 and for example may be of the order of about .1:1.

The reaction mixture is separated into a lighter hydrocarbon fraction and a heavier catalyst fraction, the bulk of the latter being retained in or returned to the reactor. Fluorides are removed from the hydrocarbon product fraction and it is then subjected to distillation for obtaining an isobutane stream, an aviation gasoline stream (consisting essentially of branched-chain paraffin hydrocarbons) and one or more relatively high boiling naphthene streams for recycling or for use in the manufacture of specialty products.

Since boron fluoride is an expensive reagent it is essential that its losses be minimized. When light hydrocarbon gases such as methane must be purged from the system the problem of avoiding boron fluoride losses is considerably augmented. In our invention we absorb the tail gases from the hot settler following the reactor and/or from the boron fluoride stripper in an absorber liquid which may be relatively cool incoming hydrogen fluoride maintained at sufficient pressure so that the boron fluoride is absorbed or bound while hydrocarbons are substantially unabsorbed so that they may be removed in the liquid or gaseous state. A particularly desirable absorber liquid is an intimate mixture of an aromatic hydrocarbon, such for example as toluene or ethyl toluene, with hydrogen fluoride because boron fluoride forms a complex with such intimate mixtures or solutions and hence may be readily separated from other gases at pressures as low as atmospheric pressure.

The relatively spent catalyst material (which is a liquid mass containing catalyst complex, tarry material, dissolved catalyst components, aromatics, etc.) is reduced to a relatively low pressure and heated to about 90 to 200° F. to partially decompose the complex and drive off hydrogen fluoride and small amounts of boron fluoride. The heated material is then allowed to settle for the separation and recovery of any aromatic hydrocarbons. The remaining material is then heated to a higher temperature of about 200 to 500° F. for decomposing any complex present and thus recovering residual boron fluoride and hydrogen fluoride which may be absorbed, compressed or otherwise returned to the reactor.

The invention will be more clearly understood from the following detailed description read in conjunction with the accompanying drawing which forms a part of this specification and which is a schematic flow diagram of our improved continuous conversion process.

A naphthenic hydrocarbon such as cyclohexane, alkyl cyclohexanes, alkyl cyclopentanes or mixtures thereof with each other or with other hydrocarbons is introduced from source 10 by pump 11 through line 12. The charge is as rich in naphthenes as is commercially feasible and it may consist of a pure hydrocarbon, a relatively narrow boiling naphthene fraction or a wide boiling naphthene fraction. The charge is preferably relatively free from olefins in order to minimize the possible formation of alkyl fluorides and to minimize alkylation. Aromatics in the charge necessitate an increased load on the catalyst recovery system but our system provides a method and means for simultaneously extracting aromatics from charging stock and thereby provides a unique system for handling charges containing aromatics as well as naphthenes. The conditions of our process are rather drastic for paraffinic hydrocarbons and the charge should therefore not contain large amounts thereof. The invention is particularly useful for the conversion of so-called naphthenic "slop" cuts from virgin gasoline and it may be applied to a naphthenic gasoline, kerosene, gas oil or heavier fraction. In this particular example, the charge consists essentially of cyclohexane. The charge is admixed with a recycle stream from line 15, passed through heat exchanger 16, admixed with catalyst from line 17 and introduced in line 18 at a low point in reactor 19.

The reaction may be effected in any suitable type of reactor on a batchwise, multiple batch, semi-continuous or continuous basis but we prefer to employ a continuous process with a tower-type reactor and to effect the conversion by passing the charging stock upwardly through the column of catalyst maintained in the liquid phase either with or without mechanical agitation. The reactor may be of the type generally used for effecting alkylation of olefins with isoparaffins as exemplified by U. S. 2,238,802 or it may be of the type described in U. S. 2,349,821 for effecting isomerization of paraffins. It may be about 5 to 50 feet in height and should be designed to withstand a maximum operating pressure which with the high temperatures may be as high as 3000 pounds per square inch. Before the reaction is initiated the reactor may be filled about half to three-fourths full of catalyst and heated by any conventional means to reaction temperature.

Hydrogen is introduced into the reactor through line 13 preferably in amounts within the approximate range of 200 to 800 or about 400 cubic feet per barrel of naphthenes entering the reactor through line 18. The catalyst in this specific example is hydrogen fluoride containing about 10 weight percent (based on said hydrogen fluoride) of boron fluoride. For each volume of hydrocarbon introduced into the reactor we may introduce about .05 to about .5, e. g. about .1 volume of the catalyst mixture, the bulk of this mixture being introduced through line 17 although a portion of it may be introduced through line 20. A larger ratio of catalyst to oil is required when the charging stock contains aromatics because the solution of aromatics in the catalyst in the reactor tends to decrease catalyst activity and necessitates catalyst withdrawal, recovery and recycling at an increased rate. With a substantially anhydrous charging stock a trace of water may be added and/or a small amount of aqueous hydrogen fluoride-boron fluoride through line 21 so that the catalyst in the reactor will contain about .01 to 1% but not substantially more than 2 or 3% of water.

The reactor in this case may be operated at a temperature of about 300 to 350° F. or about 330° F. and a pressure of the order of 1500–1800 pounds per square inch. The charging stock passes upwardly through the liquid column of catalyst in the reactor and the bulk of the catalyst separates from the effluent product stream in the upper part of the reactor although some catalyst material is carried with the effluent product stream through line 22 and cooler 23 to settler 24. Catalyst material which settles out in this settler may be returned by lines 25 and 26 to the reactor. In this particular case the space velocity in the reactor may be about 1 volume of hydrocarbon charging stock per hour per volume of catalyst in the reactor.

The settler 24 may be operated at substantially reactor pressure and at sufficient elevation so that the liquid catalyst may flow by gravity back to the reactor. Alternatively we may employ a pressure reducing valve in line 22 and operate the settler at a much lower pressure, for example of the order of about 200 to 400 pounds per square inch, in which case a pump will be employed in line 25. Separated gases may be withdrawn through lines 27 and 28 to absorber 29. The product stream passes through line 30 to boron fluoride stripper 31 which is provided with a suitable reheating means or reboiler 32 at its base. Line 30 may be provided with a suitable pressure reducing valve or pump depending upon the relative pressures in settler 24 or stripper 31 respectively. The stripper may operate at a pressure of about 200 to 300 pounds, for example about 250 pounds per square inch, and sufficient heat is supplied to insure the removal of substantially all of the boron fluoride which passes by line 33, compressor 34 (when necessary) and line 28 to the base of absorber 29. We prefer to operate the stripper and absorber at such temperatures and pressures that the use of compressor 34 may be eliminated. Make-up boron fluoride may be supplied from source 35 and introduced into the system by compressor 36 to line 28.

After removal of boron fluoride the product stream passes by line 37 to azeotropic distillation still 38 which is provided with a suitable heating means or reboiler 39 at its base and which may likewise be provided with reflux means at its top. A butane-hydrogen fluoride azeotrope passes overhead through line 40, through condenser 41 to settler 42 which is operated at as low a temperature as can be obtained with available cooling water, preferably well below 100° F. The condensed azeotrope separates into a heavier hydrogen fluoride layer which is withdrawn by line 43 to hydrogen fluoride storage tank 44. The upper butane layer is returned as reflux by line 45 and pump 46 to still 38 and eventually passes downwardly with the product stream. Any propane or lighter gases may be vented through line 47; such gases should contain no boron fluoride but if they do they may be compressed if necessary and introduced through line 28 to absorber 29.

If the product stream withdrawn from the base of azeotropic still 38 through line 48 is substantially free from alkyl fluoride and hydrogen fluoride it may require no special treatment for fluoride removal. A conventional bauxite or equivalent treating system 48' is however preferably employed at this point to insure the removal of any traces of boron fluoride, alkyl fluorides or hydrogen fluoride which may be present.

The product stream is then introduced by line 48 into stabilizer or debutanizer tower 49 which is provided with a suitable heater or re-boiler 50 at its base and suitable reflux means 51 at its top. In this and other fractionating towers any conventional heating and cooling means may be employed and in actual practice the reflux is usually obtained by condensing the overhead and returning at least a part of the resulting condensate to the top of the tower. A butane stream is withdrawn overhead through line 52 and it will consist chiefly of isobutane, which is valuable for producing isooctane by alkylation with butenes and for other purposes.

The debutanized product stream then passes by line 53 to fractionating tower 54 which is likewise provided with a reboiler at its base and a reflux means at its top and which is operated to take overhead branched-chain paraffinic hydrocarbons containing about 5 to 6 or 7 carbon atoms per molecule, i. e. a fraction boiling from about 70 to about 190° F. When the conversion conditions or time or contact are not sufficient to insure the substantial absence of cyclohexane and methyl cyclopentane from the product stream the overhead fraction may have an end point of the order of about 130 to 140° F. thus limiting the overhead to a product consisting chiefly of isopentane, neohexane and diisopropyl.

The stream withdrawn from the base of tower 54 through line 56 to fractionating tower 57 will consist chiefly of higher boiling naphthenes although it may contain some methyl pentanes and heptanes if a low end point is maintained on products withdrawn through line 55. The operation of recycle fractionating tower 57 will depend largely upon the relative value of the specific materials as recycle stock and as a source of material for specialty products. Specific high boiling naphthenes may for example be dehydrogenated to form special solvency naphthas of relatively low volatility. We may recycle the overhead from tower 57 through lines 58, 59 and 15 or we may withdraw this fraction from the system through line 60 for isomerization in a separate system or for other uses. An intermediate fraction may be withdrawn through line 61 and may be recycled if desired. The high boiling fraction withdrawn through line 62 may either be recycled through lines 59 and 15 or may be withdrawn from the system through line 63. In some cases it may be desirable to dispense entirely with fractionating tower 57 and to simply recycle the bottoms from tower 54 through lines 56, 56', 59 and 15.

Isobutane is a valuable source material for alkylate aviation fuel and large volumes of it are hence usually desirable. However, if it is desired to decrease isobutane production and increase the production of $C_5$—$C_6$ branched-chain paraffinic hydrocarbons we may recycle a substantial amount of isobutane through line 52'. Recycle rates as high as 1 or 2 volumes of liquid isobutane per volume of naphthenes charged to the reactor greatly retards the formation of butanes and particularly lighter gases in the conversion step.

Relatively spent catalyst material may be withdrawn from the reactor through line 65 or from settler 24 through lines 25 and 66 and thence passed through pressure reducing valve 67 to decovery drum 68 which is preferably operated near atmospheric pressure, for example at about 5 pounds gauge pressure and at a temperature of the order of 90 to 200° F. but usually not substantially higher than about 150° F. Under these conditions hydrogen fluoride and some boron fluoride passes up through line 69 and it may pass directly through condenser 70 to receiver 71. Boron fluoride may be withdrawn from the top of receiver 71 through line 71' to line 20. Hydrogen fluoride may be pumped via line 72 to hydrogen fluoride storage tank 44. If there is a tendency for moisture to accumulate in the system we may introduce the hydrogen fluoride-boron fluoride mixture from line 69 into silver-lined distillation column 73 which is provided with heating means 74 and we may take substantially anhydrous hydrogen fluoride and boron fluoride overhead through line 75, and condenser 70 to receiver 71, returning a portion of the condensate through line 76 to serve as reflux. An aqueous hydrogen fluoride-boron fluoride solution may be withdrawn from the base of column 73 through line 77 and withdrawn from the system through line 78 although a small part thereof may be returned through line 21 by pump 79 in order to supply the desired trace of water in the reactor. By keeping the temperature in drum 68 below about 200° F. and preferably below about 150° F. the complex is not completely decomposed and the only boron fluoride evolved will be that contained in solution in the catalyst and loosely bound in complex material. Some boron fluoride may simply pass along with the hydrogen fluoride to storage tank 44, but any undissolved boron fluoride may be handled via line 71'.

After such hydrogen fluoride and boron fluoride have been removed therefrom, the remaining spent catalyst material is withdrawn through line 80 to settler 81 wherein an upper aromatic hydrocarbon layer may be recovered from the lower complex layer and passed by line 82, pump 83 and a bauxite system 82' for fluoride removal. By removing a portion of the hydrogen fluoride and boron fluoride from the spent catalyst material aromatic hydrocarbons held in solution as a loosely bound hydrogen fluoride-boron fluoride complex are liberated and by employing the settling or separation step a considerable amount of aromatic hydrocarbons may be recovered which would otherwise be lost. The larger the ratio of boron fluoride to hydrogen fluoride which is employed in the reactor the larger will be the amount of aromatics that can be recovered in settler 81.

The complex and tarry material which settles out in settler 81 is withdrawn through line 84 to drum 85 which is provided with heating means 86. This drum is operated at about atmospheric pressure or higher and at a temperature of the order of 230° to 500° F. or more under which conditions the remaining complex is decomposed and boron fluoride and hydrogen fluoride are liberated. The liberated boron fluoride and hydrogen fluoride may be compressed by compressor 87 and returned by lines 20 and 18 to reactor 19, but are preferably introduced through line 20' to the base of absorber 29, the latter arangement offering the advantage of providing better control on the amount and composition of catalyst entering the reactor. A tarry residue is withdrawn from the system through line 88.

Make-up hydrogen fluoride may be added to the system from source 89 to storage tank 44. Hydrogen fluoride is pumped from this storage tank by pump 90 and passed by line 91 to the upper part of absorber 29 which may operate at a pressure which may be as high as 1000 pounds per square inch and in this particular example may operate at about 240 pounds per square inch. At such pressures and at the relatively low temperature of the order of about 100° F. or lower the boron fluoride is absorbed in or loosely bound to the hydrogen fluoride but the hydrocarbon gases are unabsorbed therein and may be vented fom the top of the absorber through line 92. By this means losses of boron fluoride are substantially prevented while the system is being purged from methane and any other light gases which may tend to accumulate therein. It should be understood that make-up hydrogen fluoride may be introduced directly into the top of the absorber and that line 43 and/or 72 may likewise lead to the absorber rather than to a hydrogen fluoride storage tank.

Our invention is not limited to the use of hydrogen fluoride as an absorber, but it is important to note that absorption systems of the type used for hydrogen chloride in isomerization plants are not suitable for boron fluoride recovery, particularly since it is desirable to vent any propane through line 92 rather than from line 41. We have discovered that a most effective absorbent for boron fluoride is an intimate mixture or solution of an aromatic hydrocarbon such as toluene, ethyltoluene, diethylbenzene, or the like with hydrogen fluoride. It appears that boron fluoride chemically reacts with such mixture to form a complex which is soluble in liquid hydrogen fluoride. By utilizing such complex formation to remove boron fluoride, it may be separated from extraneous gases at atmospheric pressure, so that compressor 87 may be eliminated as well as compressor 34.

An effective method of operation is to introduce enough $C_7$ to $C_{11}$ aromatics from line 64 to the upper part of absorber 29 to maintain a liquid hydrocarbon layer above the acid level in the absorber. Intimate mixing can be obtained by spraying hydrofluoric acid laterally or downwardly into this aromatic layer (or by any other means) so that any boron fluoride not absorbed in the lower part of tower 29 will react with the intimate mixture in the top thereof to form complex and be positively prevented from leaving the absorber with extraneous gases. The resulting complex is scrubbed out of the mixture by incoming hydrogen fluoride and carried as a solution therein with the catalyst leaving the absorber through line 17.

Results obtainable by the use of our invention have been demonstrated in comparative batch runs carried out in a 1500 cc. carbon steel bomb fitted with a 1725 R. P. M. mechanical stirrer and a bleed-off tube terminating at a point well above the catalyst level, allowing ready removal of supernatant hydrocarbon from the reaction mixture. Run A was made by simply contacting cyclohexane with hydrogen fluoride-boron fluoride catalyst at a temperature of about 330° F. for approximately one hour in the absence of added hydrogen. Run B was under substantially the same conditions as run A except that it was effected under a hydrogen pressure of about 1600 to 1800 pounds per square inch; in order to maintain such hydrogen pressure at reaction temperature hydrogen had to be added five times during the run, since considerabe hydrogen (about .98 mol) was consumed. Run C was under substantially the same conditions as run B except that the time of contact was about 3½ hours instead of only 1 hour; here again hydrogen had to be added from time to time and about twice as much hydrogen (2.0 mols) was consumed. The specific conditions employed in each of these runs and the nature and distribution of products obtained therein are set forth in the following table:

| Run | A | B | C |
|---|---|---|---|
| Conditions: | | | |
| Cyclohexane, cc | 700 | 700 | 700 |
| $H_2$ p. s. i | | 1600–1800 | 1550–1800 |
| HF g | 390 | 370 | 370 |
| $BF_3$ g | 39 | 39 | 39 |
| Temp., °F | 330 | 333 | 340 |
| Time, min | ¹ 50 | ¹ 60 | 210 |
| Stabilized Prod. Vol. per cent: | | | |
| $iC_5$ | 5.0 | 6.6 | 18.1 |
| $nC_5$ | 1.5 | 2.0 | 3.6 |
| neo-$C_6$ | 3.0 | 4.1 | 3.6 |
| Other $C_6$ paraffins | 8.0 | 16.8 | 17.5 |
| $C_7$ paraffins | | | 3.0 |
| Methyl cyclopentane | 18.0 | 15.2 | 0.0 |
| Cyclohexane | 18.0 | 12.7 | 0.0 |
| Dimethylcyclopentane | 2.0 | 2.5 | 1.2 |
| Methyl cyclohexane | 6.5 | 6.6 | 7.8 |
| Trimethylcyclopentane | 1.5 | 2.0 | 2.4 |
| Dimethylcyclohexane | 12.5 | 13.7 | 12.1 |
| Bottoms (alkyl naphthenes) | 24.0 | 17.8 | 30.7 |
| $H_2$ Consumed, cu. ft | | 0.78 | 1.58 |
| Wt. per cent Condensibles ² | 12.6 | 16.4 | 41.3 |
| Total Paraffin yield, Wt. per cent | 28.1 | 42.6 | 83.3 |
| Ratio: Liquid Paraffins/Condensibles | 1.23 | 1.60 | 1.02 |

¹ This difference in contact time was unintentional, does not nullify the positive nature of the results.
² Substantially $i$-$C_5$.

Particular attention is directed to the fact that the paraffinic product in run A (effected in the absence of hydrogen) totaled 28.1 weight percent as compared to 42.6 weight percent in run B where hydrogen was present. In run C wherein the contact in the presence of hydrogen was effected for a prolonged contact time the total yield of paraffins increased to 83.3 weight percent. On a volume percent basis the total yield of paraffins in run C amounted to 104 volume percent based on cyclohexane charge. Another noteworthy and very remarkable fact is that the cyclohexane completely disappeared in run C indicating 100% conversion of the original charging stock.

From the above tabulation it will be seen that the use of hydrogen without materially changing contact time resulted in a 50% increase in the total weight percent paraffin yield and that more specifically it resulted in practically doubling the production of $C_6$ paraffins other than neohexane, at the same time showing a marked increase in the production of isopentane, neohexane, etc. The ratio of liquid paraffins to condensibles was increased from 1.23 in the absence of hydrogen to 160 in the in the presence of hydrogen. In spite of the fact that the weight percent of condensibles (chiefly isobutane) was markedly increased there was likewise a substantial increase in the production of pentanes and hexanes most of which were of branched-chain structure. The higher molecular weight naphthenes produced are much more valuable than cyclohexane for the production of high solvency naphtha (by dehydrogenation) and they may be specifically utilized for this or other purposes; by recycling the higher boiling alkyl naphthenes we can produce still further amounts of normally liquid branched-chain paraffins and isobutane.

While we have described in considerable detail a specific example of our continuous process and have set forth results obtainable by the use of our invention it should be understood that the invention is not limited to this specific example or the conditions described in connection therewith since other modifications and alternative operation conditions will be apparent from the above detailed description to those skilled in the art.

We claim:

1. A continuous process for converting naphthenes to paraffins which comprises contacting a charging stock containing a substantial proportion of aromatic hydrocarbons and naphthenic hydrocarbons with a hydrogen fluoride-boron fluoride catalyst containing between about 1 and about 40 weight percent of boron fluoride, based on the hydrogen fluoride, at a temperature between about 150 and about 450° F. in the presence of added hydrogen, under a total pressure of 600 to 3000 pounds per square inch in a reaction zone, maintaining intimate contact of said charging stock and catalyst in said reaction zone for a period of about 0.01 to about 4 hours while maintaining in the reaction zone an amount of catalyst within the approximate range of 20 to 70 volume percent of the total reactor contents therein, whereby the reactor contents separate in situ into an upper hydrocarbon phase and a lower catalyst phase containing extracted aromatic hydrocarbons, removing said lower catalyst phase from the reaction zone, removing dissolved and loosely bound catalyst from said phase, thereafter separating aromatic hydrocarbons from said phase, subsequently separating from said phase a catalyst complex containing firmly bound hydrogen fluoride and boron fluoride, thermally decomposing said complex to regenerate hydrogen fluoride and boron fluoride, and recycling catalyst separated from said lower catalyst phase to the reaction zone.

2. A continuous process for converting naphthenic hydrocarbons to paraffinic hydrocarbons which comprises contacting a charging stock containing a substantial proportion of naphthenic and aromatic hydrocarbons in a reaction zone with hydrogen and a body of liquid hydrogen fluoride-boron fluoride catalyst containing between about 1 and about 40 weight per cent of boron fluoride, based on the hydrogen fluoride, under conditions of temperature, pressure and time adapted to hydrogenate naphthenic hydrocarbons, removing from the reaction zone a liquid catalyst layer containing an aromatic hydrocarbon, removing dissolved and loosely-bound catalyst from said layer, thereafter separating aromatic hydrocarbons from said layer, subsequently separating from said layer a catalyst complex containing firmly-bound hydrogen fluoride and boron fluoride, thermally decomposing said complex to regenerate hydrogen fluoride and boron fluoride, and recycling catalyst separated from said catalyst layer to said reaction zone.

3. The method of converting naphthenic hydrocarbons in substantial yield to paraffinic hydrocarbons containing substantially the same number of carbon atoms in the molecule, which method comprises contacting a charging stock containing a normally liquid monocyclic naphthenic hydrocarbon containing between 5 and 6 carbon atoms, inclusive, in the naphthenic ring in a conversion zone with a hydrogen fluoride-boron fluoride catalyst containing between about 1 and about 40 weight per cent of boron fluoride, based on the hydrogen fluoride, at a temperature between about 150° F. and about 450° F. and a total pressure between about 600 and about 3000 pounds per square inch with added hydrogen in an amount between about 200 and about 400 cubic feet per barrel of naphthenic hydrocarbon charging stock.

4. The method of claim 3 wherein the naphthenic hydrocarbon is cyclohexane.

5. The method of converting naphthenic hydrocarbons in substantial yield to paraffinic hydrocarbons containing substantially the same number of carbon atoms in the molecule, which method comprises contacting a charging stock containing a normally liquid monocyclic naphthenic hydrocarbon containing between 5 and 6 carbon atoms, inclusive, in the naphthenic ring in a conversion zone with a hydrogen fluoride-boron fluoride catalyst containing between about 1 and about 40 weight per cent of boron fluoride, based on the hydrogen fluoride, at a temperature between about 150° F. and about 450° F. and a total pressure between about 600 and about 3000 pounds per square inch with added hydrogen, and continuing the contacting with hydrogen until between about 15 and about 30 mols of hydrogen are consumed per 100 mols of naphthenic hydrocarbons charged.

6. The method of claim 5 wherein the naphthenic hydrocarbon is cyclohexane.

7. The method of converting naphthenic hydrocarbons in substantial yield to paraffinic hydrocarbons containing substantially the same number of carbon atoms in the molecule, which method comprises contacting a charging stock containing a normally liquid monocyclic naphthenic hydrocarbon containing between 5 and 6 carbon atoms, inclusive, in the naphthenic ring in a conversion zone with a hydrogen fluoride-boron fluoride catalyst containing between about 1 and about 40 weight per cent of boron fluoride, based on the hydrogen fluoride, under elevated conditions of temperature and pressure with added hydrogen in an amount between about 100 and about 800 cubic feet per barrel of charging stock, containing the contacting until an appreciable amount but not more than about 30 mols of hydrogen are consumed per 100 mols of naphthenic hydrocarbons charged, and recovering paraffinic hydrocarbons thus produced.

8. The method of converting naphthenic hydrocarbons in substantial yield to paraffinic hydrocarbons containing substantially the same number of carbon atoms in the molecule, which method comprises contacting a charging stock containing a normally liquid monocyclic naphthenic hydrocarbon containing between 5 and 6 carbon atoms, inclusive, in the naphthenic ring in a conversion zone with a hydrogen fluoride-boron fluoride catalyst containing between about 1 and about 40 weight per cent of boron fluoride, based on the hydrogen fluoride, under elevated conditions of temperature and pressure with added hydrogen in an amount between about 100 and about 800 cubic feet per barrel of charging stock, continuing the contacting until an appreciable amount but not more than about 15 mols of hydrogen are consumed per 100 mols of naphthenic hydrocarbons charged, and recovering paraffinic hydrocarbons thus produced.

9. The method of converting naphthenic hydrocarbons in substantial yield to paraffinic hydrocarbons containing substantially the same number of carbon atoms in the molecule, which method comprises contacting a charging stock containing a normally liquid monocyclic naphthenic hydrocarbon containing between 5 and 6 carbon atoms, inclusive, in the naphthenic ring in a conversion zone with a hydrogen fluoride-boron fluoride catalyst containing between about 1 and about 40 weight per cent of boron fluoride, based on the hydrogen fluoride, at a temperature between about 150° F. and about 450° F. and a total pressure between about 600 and about 3000 pounds per square inch with added hydrogen, continuing the contacting with hydrogen until an appreciable amount but not more than about 15 mols of hydrogen are consumed per 100 mols of naphthenic hydrocarbons charged, and recovering paraffinic hydrocarbons thus produced.

10. The method of converting naphthenic hydrocarbons in substantial yield to paraffinic hydrocarbons containing substantially the same number of carbon atoms in the molecule, which method comprises contacting a charging stock containing a normally liquid monocyclic naphthenic hydrocarbon containing between 5 and 6 carbon atoms, inclusive, in the naphthenic ring in a conversion zone with a hydrogen fluoride-boron fluoride catalyst containing between about 1 and about 40 weight per cent of boron fluoride, based on the hydrogen fluoride, at a temperature between about 150° F. and about 450° F. and a total pressure between about 600 and about 3000 pounds per square inch with added hydrogen, continuing the contacting with hydrogen until an appreciable amount but not more than about 30 mols of hydrogen are consumed per 100 mols of naphthenic hydrocarbons charged, and recovering paraffinic hydrocarbons thus produced.

ARTHUR P. LIEN.
BERNARD L. EVERING.

REFERENCES CITED

The following references are of record in the file of this patent:

UNITED STATES PATENTS

| Number | Name | Date |
| --- | --- | --- |
| 1,963,385 | Russell | June 19, 1934 |
| 2,172,146 | Ruthruff | Sept. 5, 1939 |
| 2,343,841 | Burk | Mar. 7, 1944 |
| 2,357,495 | Bloch | Sept. 5, 1944 |
| 2,220,090 | Evering et al. | Nov. 5, 1940 |
| 2,343,744 | Burk | Mar. 7, 1944 |

FOREIGN PATENTS

| Number | Country | Date |
| --- | --- | --- |
| 117,359 | Australia | Aug. 19, 1943 |

OTHER REFERENCES

Henne et al., "Reactivity and Influence of Fluorine in Aliphatic Compounds," Jour. Amer. Chem. Soc. 58, 882 (1 page). (Patent Office Library.)